Figure 1:
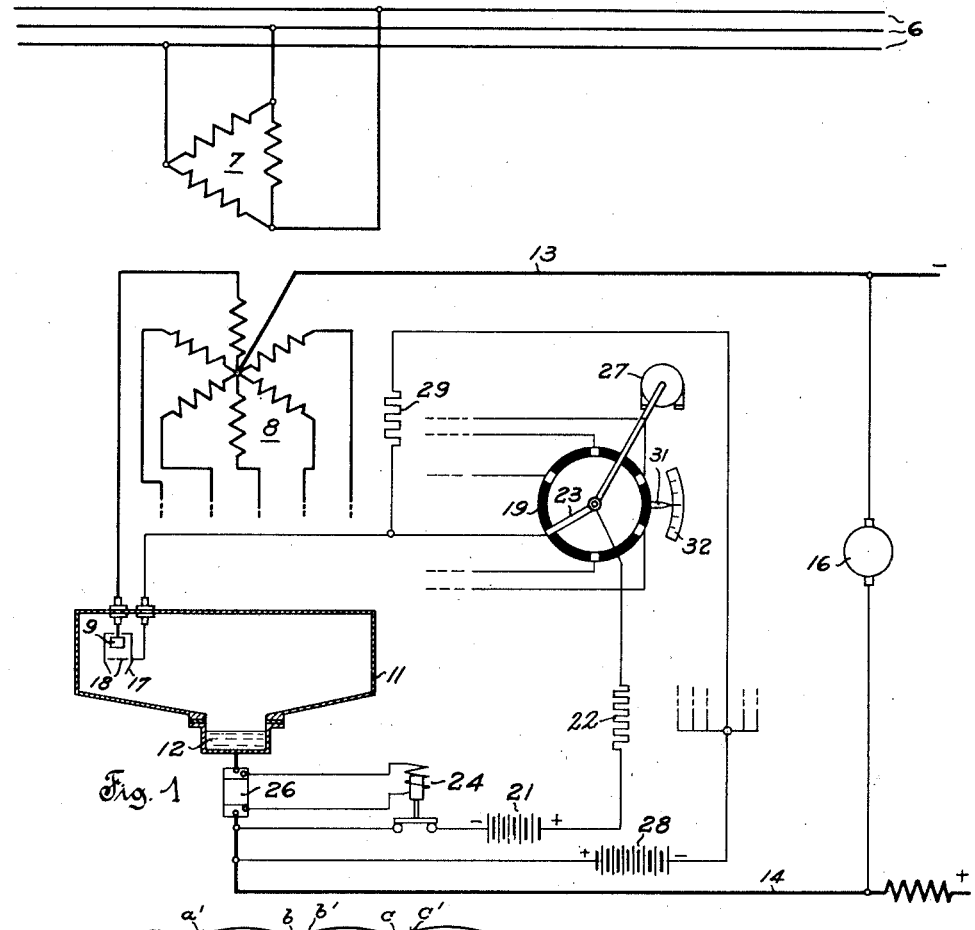

Dec. 8, 1936.　　　　S. WIDMER　　　　2,063,281
ELECTRIC CURRENT RECTIFYING SYSTEM
Filed Feb. 5, 1932　　　2 Sheets-Sheet 1

Inventor
S. Widmer
by
Attorney

Patented Dec. 8, 1936

2,063,281

UNITED STATES PATENT OFFICE 2,063,281

ELECTRIC CURRENT RECTIFYING SYSTEM

Stefan Widmer, Baden, Switzerland, assignor to Aktiengesellschaft Brown Boveri & Cie., Baden, Switzerland, a joint-stock company of Switzerland Application February 5, 1932, Serial No. 591,013
In Germany February 5, 1931

7 Claims. (Cl. 175—363)

This invention relates to improvements in electric current rectifying systems employing an electric current rectifier of the metallic vapor arcing type and particularly to means used in connection with such rectifier for controlling the direct voltage delivered thereby.

The operation of electric current rectifiers of the metallic vapor arcing type may be controlled by the use of control electrodes associated with the anodes by impressing a potential on the control electrodes. The potential on the control electrodes must be changed periodically from positive to negative relative to the cathode potential and the voltage of the positive potential applied to the control electrodes must be at least as much above the cathode potential as the voltage drop in the arc. The moment at which the arc is picked up by an anode may be accelerated or retarded by varying the charge on the control electrodes and the output voltage of the rectifier may thus be controlled. Such voltage regulation may be obtained by applying the positive and negative potential to the control electrodes from either an alternating current source or from a direct current source.

The control electrodes may be supplied from a source of alternating current potential, the phases of which are displaced relative to the phases of the potentials applied to the anodes by means such as the induction regulator or a transformer using a polygon winding on which the connections with the control electrodes may be varied. Output voltage regulation of a rectifier is possible, however, also if the phase position of the alternating current potential supplied to the control electrodes is not changed relative to that of the potential impressed on the anodes if the potential supplied to the control electrodes by the induction regulator or the potential of the neutral point of the transformer are varied either positively or negatively relative to the cathode potential by superimposing a direct current potential on the alternating potential.

Neither the application of an alternating current potential or a direct current potential alone or in combination to the control electrodes is however entirely satisfactory because the moment at which the arc will be picked up by the anodes cannot be determined and regulated with sufficient accuracy. Such deficiencies in control of the rectifier are due to the fact that the voltage drop between the control electrodes and the cathode is dependent on the temperature of the rectifier and on the ionized condition of the vapor within the rectifier. The voltage drop is therefore dependent on the load on the output circuit and also on other conditions. Thus the moment at which the arc will be picked up by the anodes is delayed when the rectifier is cool and under low load and is accelerated when the rectifier is hot and heavily loaded.

Another disadvantage of the methods above described of applying a potential to the control electrodes is that such electrodes remain positively charged and therefore carry current after the associated anode has become negative. The result of such condition is that the vapor in the space about the anodes remains in the ionized condition and therefore readily permits backfiring or short circuits thus allowing reverse currents to flow through an anode which then acts as a cathode.

It is therefore among the objects of the present invention to provide means for controlling the voltage impressed upon the control electrodes of an electric current rectifier of the metallic vapor arcing type for the purpose of controlling the rectifier output voltage.

Another object of the invention is to provide means for exactly determining and controlling the moment at which the potential impressed on the control electrodes of an electric current rectifier of the metallic vapor arcing type is of such value relative to the cathode potential as to permit the anodes of the rectifier to pick up the arc.

Another object of the invention is to provide means for continuously applying a potential on the control electrodes of an electric current rectifier of the metallic vapor arcing type which potential will be negative relative to the cathode potential except when the arc is to be picked up by the anodes.

Another object of the invention is to provide a control system for electric current rectifiers of the metallic vapor arcing type in which a positive potential relative to the cathode potential is impressed on the control electrodes associated with the anodes, the applied potential being higher than is actually required to permit picking up of the arc by the anodes even under the most unfavorable conditions in the rectifier and being applied to each of the control electrodes for only a fraction of the period during which the associated anode operates.

Figure 2:
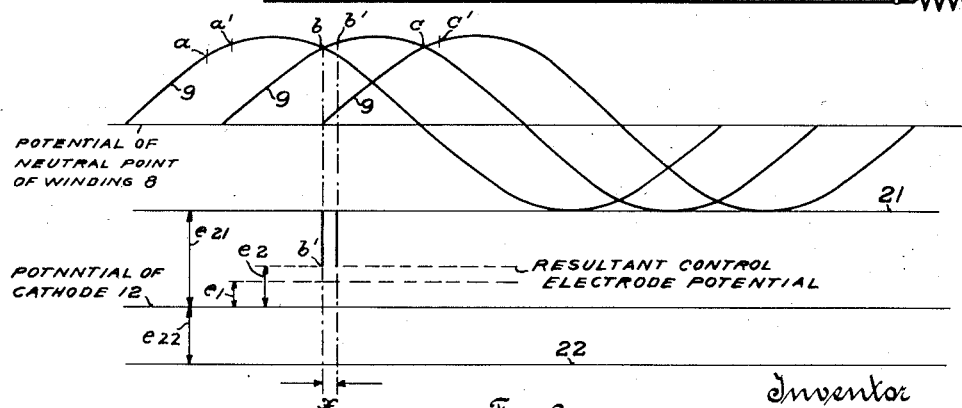
Figure 3:
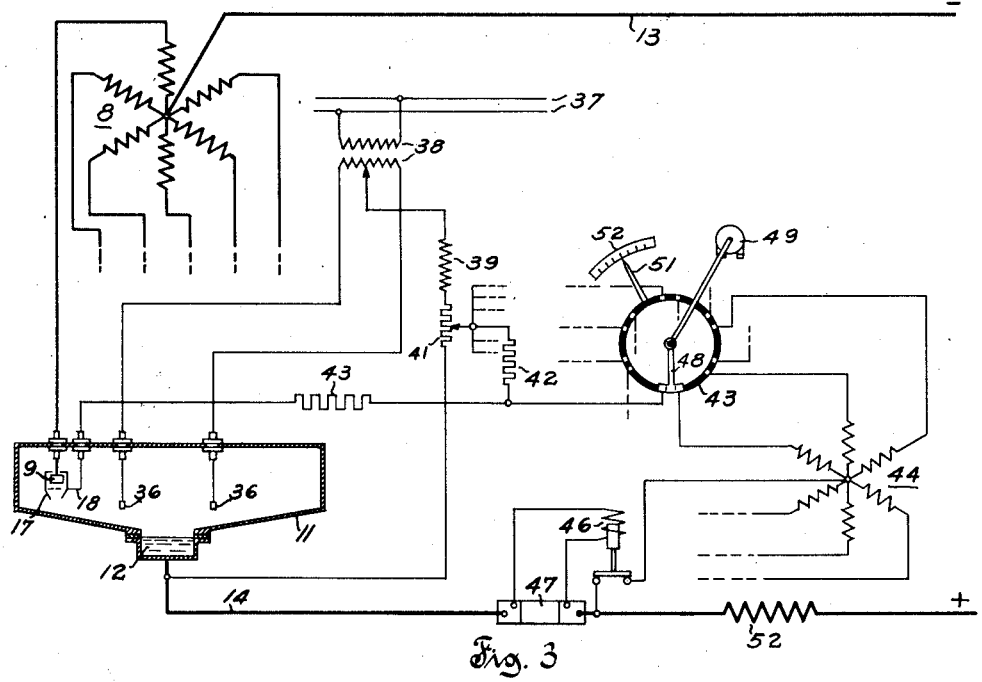
Figure 4:
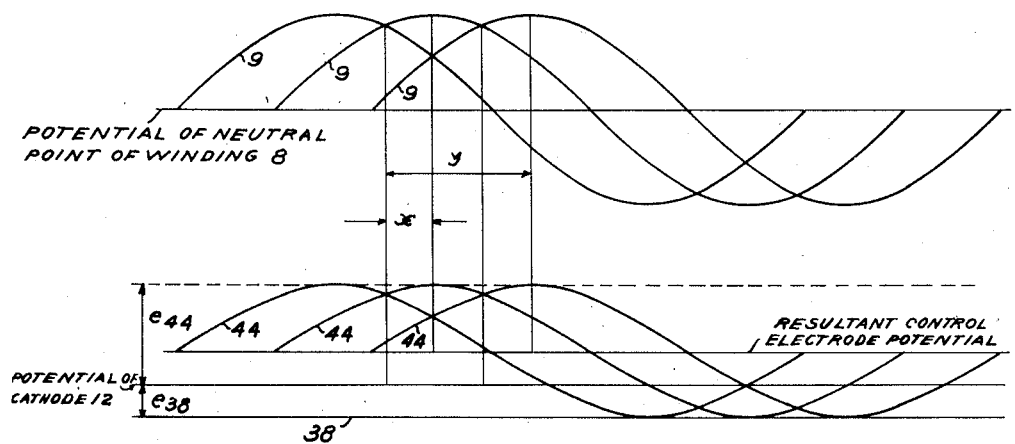

Objects and advantages other than those above set forth will be apparent from the following description when read in connection with the accompanying drawings in which:

Figure 1 schematically illustrates an electric current rectifying system employing an electric current rectifier of the metallic vapor arcing type having control electrodes associated with the anodes and provided with means for controlling the application of a potential on the control electrodes, Figure 2 illustrates graphically the potential relations of the anodes, the control electrodes and the cathode of the system shown in Figure 1 considered, however, only with relation to the time relations in the cycle of the alternating current potential supplied to the anodes, Figure 3 is a schematic illustration of a system similar to that shown in Figure 1 excepting that sources of alternating current are employed therein for applying charging potentials to control electrodes of the rectifier rather than the direct current sources employed in Figure 1, and Figure 4 is a graphic diagram similar to that shown in Figure 2 but showing the potential relations of the system illustrated in Figure 3.

Referring more particularly to the drawings by characters of reference, the reference number 6 designates a line carrying alternating current from a suitable source (not shown). The line supplies alternating current to the primary winding 7 of a transformer inductively associated with a secondary winding 8 connected with anodes 9 of an electric current rectifier 11 of the arcing type provided with a cathode 12 of vaporizable material such as mercury. The direct current output circuit is formed by a conductor 13 connected with the neutral point of the transformer secondary winding 8 and forming the negative bus bar of the circuit and a conductor 14 connected with the cathode 12 and forming the positive bus bar of the circuit which supplies a load as indicated at 16.

Each of the anodes 9 is preferably partially enclosed within an arc guide 17 within which is arranged a control electrode 18. The control electrodes 18 are each connected with a conductive segment of a commutator-like structure 19 by which a charge may be distributed to the several control electrodes. The distributor 19 is connected with the positive terminal of a source of direct current potential such as the battery 21 through a current limiting resistance 22 and a rotatable brush 23. The negative terminal of the source 21 is connected with the cathode 12 through a pair of contacts arranged to be closed by a bridge member carried by the armature of a relay 24, the operating coil of which is connected across a shunt 26 to be energized from the positive bus bar 14 upon the occurrence of over currents therein, due to short circuits or other abnormal loads, to disconnect the battery 21 from the cathode 12. The brush 23 is connected with a motor 27 for rotation thereby, the motor being operated in synchronism with the frequency of the alternating current line 6. It will be understood of course that the distributor may be operated or that the rotation of the brush 23 thereof may be controlled by coils energized from the output voltage or current of the rectifier, or from a combination of the two as well as by other means so that the distributor may be utilized as an automatic voltage, current, or load regulating means.

A negative potential relative to the cathode potential is continuously impressed on the control electrodes 18 from a source of direct current potential 28, the positive terminal of the source 28 being connected with the cathode 12 and the negative terminal of the source 28 being connected with the control electrodes through current limiting resistances 29.

A pointer 31 is connected with the commutator 19 and moves over a scale 32. The position of the segments may be varied to permit variation of the time at which the potential of the battery 21 is applied to the control electrodes thus permitting control of the points in the cycle of potential impressed on the anodes at which the anodes may pick up the arc.

When the system is in operation, the battery 28 continuously impresses a potential on the control electrodes 18 which potential is negative relative to the cathode potential. The negatively charged control electrodes thus repel the electrons in the vicinity of the anodes regardless of the load on the rectifier and hence of the temperature of the rectifier and thus prevent the picking up of an arc by the anodes. The brush 23 is, however, continuously rotated by motor 27 and periodically makes contact with the distributor segments connected with the several control electrodes. The position of the brush is so adjusted relative to the several segments of the distributor that it contacts therewith simultaneously with the application of a positive potential of predetermined magnitude on the anodes from the supply transformer. When the brush 23 makes contact with a segment connected with a control electrode having associated therewith an anode on which a positive potential is applied from the line 6, a positive voltage impulse is applied to such control electrode from the battery 21 over resistance 22 thus making the control electrode positive relative to the cathode potential and permitting the anode to pick up the arc. The voltage of the positive potential applied from battery 21 is preferably made higher than the highest voltage required under any conditions of rectifier operation to positively insure the picking up of the arc. By varying the position of the brush relative to the potential cycle of the anodes the moment of the ignition of the several anodes may be varied, thus permitting control of the output voltage of the rectifier.

Figure 2 illustrates the potential relations of the anodes, the control electrodes and the cathode of the system shown in Figure 1 with relation to the time element of the cycle of alternating current potentials supplied to the anodes. The potentials of the several anodes are indicated by the curves designated 9 taken relative to the potential of the neutral point of the transformer secondary winding 8. The potentials impressed on the control electrodes are indicated relative to the potential of the cathode 12. A potential indicated by line 22 which is negative relative to the cathode potential by the amount $e_{22}$ is continuously applied to the control electrodes. The line 21 represents the potential of battery 21 which is applied to the control electrodes by the operation of the distributor 19, 23. The potential resulting from the negative potential $e_{22}$ and the positive potential $e_{21}$ which are simultaneously applied to the control electrodes is thus the algebraic addition of the two potentials representing the potential of the battery 21 and the potential of the battery 22 and results in a potential which is positive relative to the cathode and which is indicated by the dotted line designated "the resultant control electrode potential." Assuming that the distributor brush is adjusted to cause the impression of the positive potential $e_{21}$ on the control electrodes at the points marked $a$, $b$, and c on the several anode potential curves 9, the control electrodes will permit the anodes to pick up the arcs at such points. Again assuming that the conductive segments of the distributor are of such breadth as to result in application of the positive potential of battery 21 on the control electrodes for the time represented by the distance $x$, the control electrodes will again become negative relative to the cathode potential at the points $a'$, $b'$, and $c'$. The occurrence of backfires or a short circuit within the rectifier, or a short circuit on the direct current output circuit which might result in the flow of reverse currents or overcurrents of any nature in such circuit are thus prevented because the control electrode associated with each anode is again negative relative to the cathode potential shortly after such anode has picked up the arc.

Figure 3 of the drawings illustrate a system for accomplishing a result similar to that above described by the application of alternating current potentials rather than direct current potentials on the control electrodes. The drawings illustrate a pair of excitation anodes 36 such as are usual in electric current rectifiers of the metallic vapor arcing type, which excitation anodes are supplied with alternating current potential from a suitable supply line 37 through a transformer 38. The midpoint of the secondary winding of the transformer 38 is connected with the cathode 13 through a reactance 39 and a resistance 41. The control electrodes 18 are continuously supplied with a negative potential relative to the cathode potential from the resistance 41 through resistance 42 and resistance 43. The control electrodes are also connected with a distributor structure 43 on which the terminals of the control electrode connections and the terminals of the secondary winding 44 of a transformer connected with a suitable source of alternating current (not shown), are arranged in pairs. The neutral point of the transformer secondary winding 44 is connected with the positive bus bar 14 of the direct current output circuit through a pair of contacts normally bridged by a relay 46, the coil of which is connected in parallel with a shunt 47 included in the positive bus bar 14.

The pairs of terminals constituting the conductive portions of the distributor structure 43 are arranged to be bridged in sequence by a rotatable brush 48 which is connected to be operated by a motor 49 operating in synchronism with the frequency of the line 6. A pointer 51 is connected with the distributor 43 and is arranged to move over a scale 52 upon which is thus indicated the position of the distributor relative to the potential applied to the anodes.

A reactance 52 is preferably connected in the direct current output circuit to smooth out ripples remaining in the output in spite of the above method of voltage control.

The potential relations of the anodes, the control electrodes and the cathode for the arrangement shown in Figure 3 are graphically shown in Figure 4 relative to the time element of the cycle of alternating current potential supplied to the anodes. In the diagram the curves 9 indicate the anode potentials and are shown relative to the potential of the neutral point of the transformer secondary winding 8 and the potentials supplied to the control electrodes by the transformer winding 44, indicated by curves designated 44, are shown relative to the potential of the cathode 12. Thus, during the time $x$ when the transformer 44 is connected with the control electrodes, the potential of the secondary phase windings of transformer 44 is impressed on the control electrodes in the connection shown and the control electrodes are therefore positive relative to the cathode potential at such moment. The phase voltages of the secondary winding of the transformer are preferably chosen of such value that the voltage over the time $y$ is never less than the positive potential which must be applied on the control electrodes to secure picking up of the arc by the associated anodes even under the most unfavorable operating conditions of the rectifier. If the mid-point of the transformer secondary winding of transformer 38 and the neutral point of transformer 44 were connected in series, the potential of one winding would be superimposed on that of the other winding to produce the resultant voltage indicated as the resultant control electrode potential in Figure 4.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifying system comprising an alternating current supply line, an electric current rectifier of the vapor arcing type having a plurality of anodes, a control electrode associated with each of said anodes, and a vaporizable cathode, and a direct current output circuit for the rectifier; a plurality of sources of electrical potential, the positive terminal of one of said sources and the negative terminal of another of said sources being connected with said cathode a negative terminal of the said one source being continuously connected with each of the said control electrodes, the positive terminal of the said another of said sources being arranged for connection with the said control electrodes, a distributor operable to effect the sequential connection of the positive terminal of said another of said sources with the control electrodes, a relay for disconnecting the said another of said sources from the said cathode upon the occurrence of disturbances within the system, and means for operating said distributor in synchronism with the frequency of the alternating current line.

2. In combination, an electric current rectifier of the vapor arcing type comprising a plurality of anodes, a plurality of control electrodes respectively associated with said anodes, and a cathode, a source of alternating current connected with said anodes and supplying said rectifier, a direct current circuit connected with and supplied from said rectifier, a source of direct current potential having the positive terminal thereof connected with said cathode and the negative terminal thereof continuously connected with each of said control electrodes for preventing establishment of arcs between said anodes and cathode, a second source of direct current potential having the negative terminal thereof connected with said cathode and the positive terminal thereof connectable with said electrodes, means for momentarily and sequentially connecting the positive terminal of the second said source of potential with said control electrodes to thereby permit establishment of arcs sequentially between the associated ones of said anodes and said cathode, and means operable responsive to and upon the occurrence of flow of current above a predetermined value in said direct current circuit for interrupting the said connection of the said second source of potential with said cathode to thereby prevent establishment of an arc between any said anodes and cathode.

3. In combination, an electric current rectifier of the vapor arcing type comprising a plurality of anodes, a plurality of control electrodes respectively associated with said anodes, and a cathode, a source of alternating current connected with said anodes and supplying said rectifier, a direct current circuit connected with and supplied from said rectifier, a source of direct current potential having the positive terminal thereof connected with said cathode and the negative terminal thereof continuously connected with each of said anodes to impress thereon potential negative with respect to the potential of said cathode and of such magnitude as to prevent establishment of arcs between said anodes and cathode, a second source of alternating current potential connected with said cathode and connectable with each of said electrodes, means for momentarily and sequentially connecting said second source of alternating current potential with each of said electrodes, the frequency of the last said source of potential being the same as the frequency of the first said source of alternating current and the momentary magnitude thereof relative to the potential of said source of direct current potential being such as to impress on said electrodes potentials positive relative to the potential of said cathode greater in magnitude than necessary to establish said arcs between said anodes and said cathode under the most unfavorable conditions in the interior of said rectifier.

4. In combination, an electric current rectifier of the vapor arcing type comprising a plurality of anodes, a plurality of control electrodes respectively associated with said anodes, and a cathode, a source of alternating current connected with said anodes and supplying said rectifier, a direct current circuit connected with and supplied from said rectifier, a source of direct current potential having the positive terminal thereof connected with said cathode and the negative terminal thereof continuously connected with each of said electrodes for preventing establishment of arcs between said anodes and cathode, a second source of direct current potential having the negative terminal thereof connected with said cathode and the positive terminal thereof connectable with said electrodes, and means for momentarily and sequentially connecting said second source of direct current potential with said electrodes to thereby permit establishment of arcs between said anodes and said cathode, the potential of the said second source of direct current potential relative to the potential of the first said source of direct current potential and relative to the potential of said source of alternating current being such as to impress on said control electrodes from said second source of direct current potential positive relative to the potential of said cathode of magnitude greater than necessary to establish said arcs between said anodes and cathode under the most unfavorable conditions in the interior of said rectifier.

5. The combination with an electric current supply circuit, of an electric current load circuit, an electron discharge device interconnecting said circuits and having an electrode for controlling the flow of current therebetween means comprising a source of current for exciting said electrode in such sense as to prevent the initiation of said flow of current, means comprising a second source of current for continually exciting said electrode in such sense and during such moments as to permit the initiation of said flow of current, and means operable responsive to said flow of current above a predetermined magnitude for controlling the second said means in such sense as to prevent the excitation of said electrode by the second said source of current.

6. The combination with an alternating current supply circuit, of an electric current load circuit, an electron discharge device interconnecting said circuits and having an electrode for controlling the flow of current therebetween, means comprising a source of current for exciting said electrode in such sense as to prevent the initiation of said flow of current, means comprising a second source of current for continually exciting said electrode in such sense and during such moments relative to the voltage frequency of the first said circuit as to permit the initiation of said flow of current, and means operable responsive to the flow of current above a predetermined value in one of said circuits from said device to prevent the excitation of said electrode by the second said source of current.

7. The combination with an alternating current supply circuit, of an electric current load circuit, an electron discharge device interconnecting said circuits and having an electrode for controlling the flow of current therebetween, means comprising a source of current for exciting said electrode in such sense as to prevent the initiation of said flow of current, means comprising a source of alternating current for continually exciting said electrode in such sense and during such moments relative to the voltage frequency of the first said circuit as to permit the initiation of said flow of current, means for varying the moments of excitation of said electrode by the second said means relative to the voltage frequency of the first said circuit, and means operable responsive to the flow of said current above a predetermined value in one of said circuits from said device to prevent the excitation of said electrode by the second said source of current.

STEFAN WIDMER.